July 17, 1923.
E. S. ENGLE
1,461,771
CLUTCH PEDAL ATTACHMENT
Filed Oct. 21 1920
2 Sheets-Sheet 1
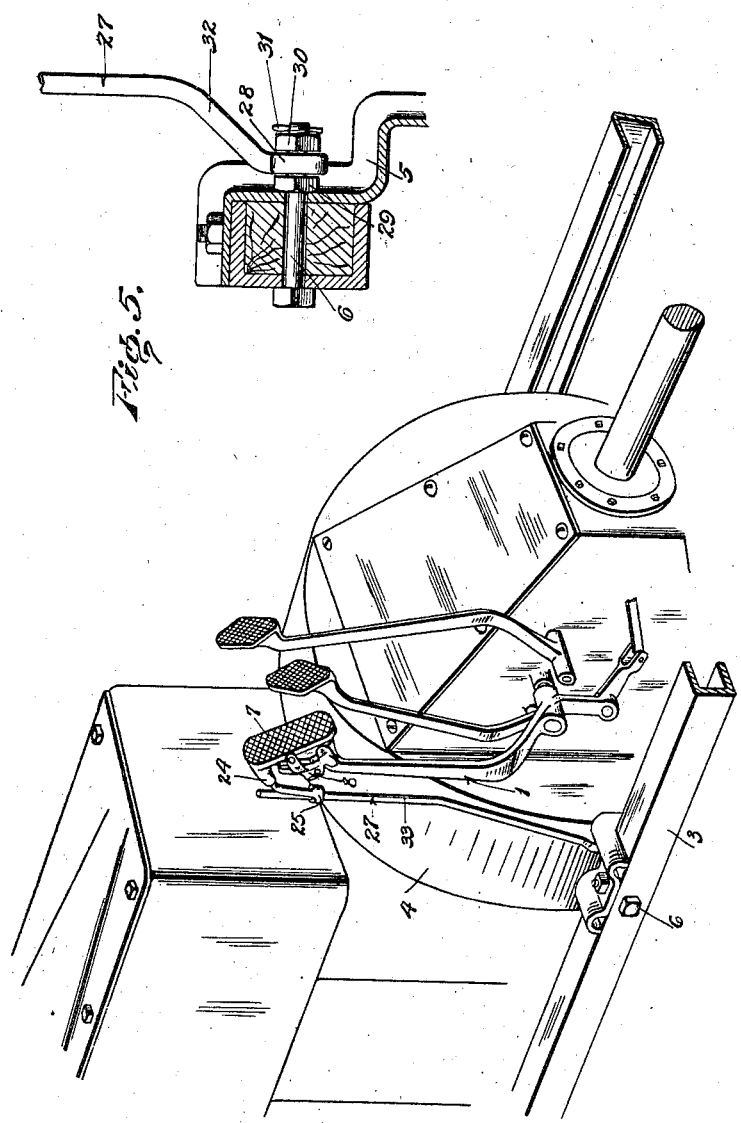
Inventor
E.S.Engle
By
Lacey & Lacey, Attorneys July 17, 1923.
E. S. ENGLE
1,461,771
CLUTCH PEDAL ATTACHMENT
Filed Oct. 21 1920
2 Sheets-Sheet 2
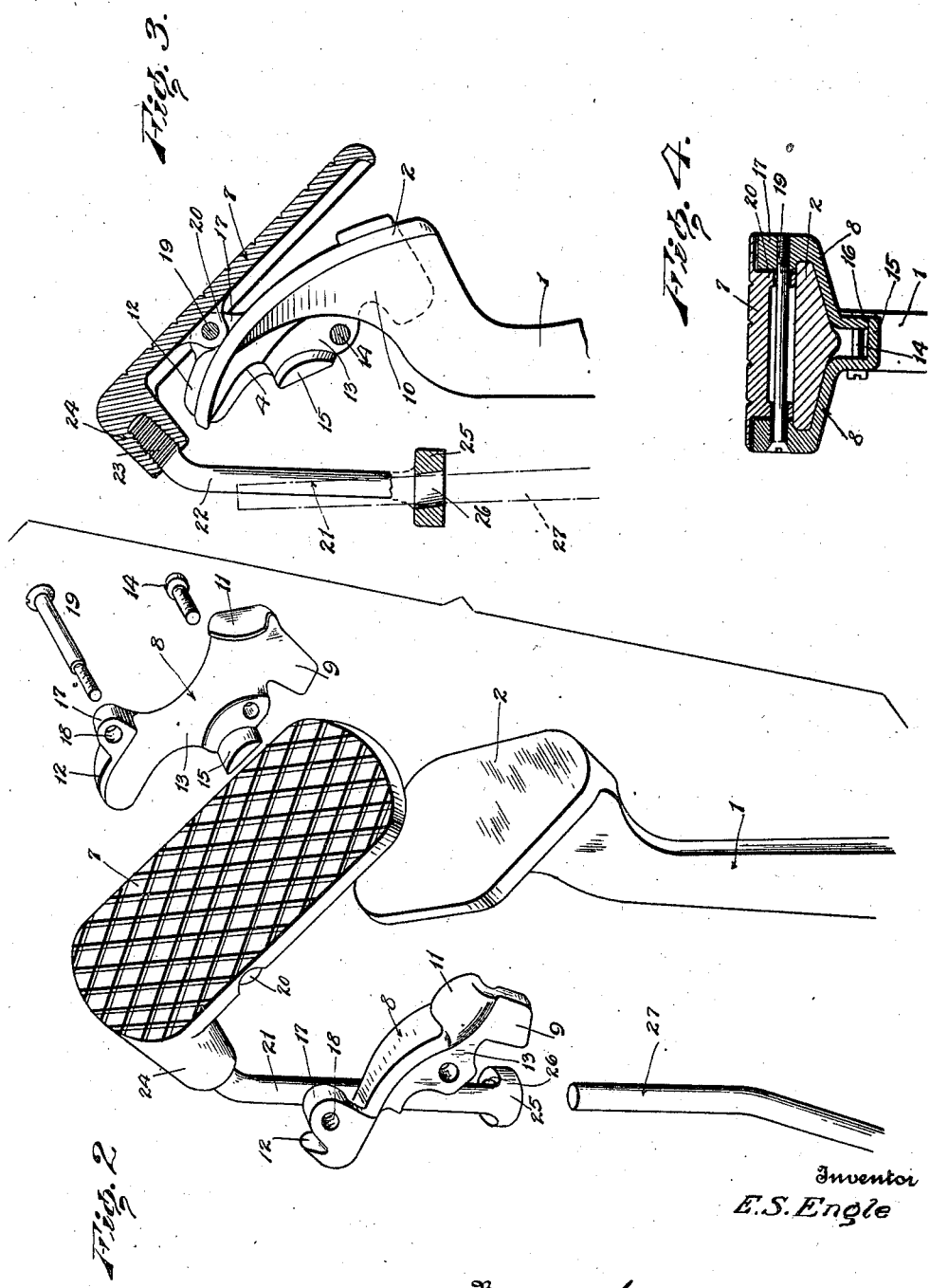
Inventor
E. S. Engle
By
Lacey & Lacey, Attorneys Patented July 17, 1923.

1,461,771

UNITED STATES PATENT OFFICE.

EDGAR S. ENGLE, OF GREENSBURG, PENNSYLVANIA.

CLUTCH-PEDAL ATTACHMENT.

Application filed October 21, 1920. Serial No. 418,358.

*To all whom it may concern:*

Be it known that I, EDGAR S. ENGLE, a citizen of the United States, residing at Greensburg, in the county of Westmoreland and State of Pennsylvania, have invented certain new and useful Improvements in Clutch-Pedal Attachments, of which the following is a specification.

This invention relates to clutch pedal attachments and more particularly to a locking attachment for the clutch pedal of a Ford automobile, and the general object of the invention is to provide a simple attachment which may be readily installed by anyone and which will serve to automatically lock the clutch pedal in neutral or low speed positions. One purpose of the attachment is to enable the driver to lock the clutch pedal in low speed position so that when it is shifted to such position in climbing a long hill, it will unnecessary for the driver to tire himself by exerting continual pressure on the clutch pedal during the climb, and in this respect the attachment is of advantage also in travelling over long stretches of sandy or muddy road. Likewise it is possible by the use of the attachment to lock the clutch pedal in low speed position and thus brake the vehicle when standing on a grade and in the event the emergency brake is for any reason inoperative. Another purpose of the attachment is to enable the operator to lock the clutch pedal in neutral position while operating the reverse pedal and without the necessity of shifting the emergency brake lever to neutral position which must be done unless the operator is sufficiently experienced in simultaneously operating both the clutch and reverse pedals. The device is also of advantage in coasting down long hills inasmuch as by its use the clutch pedal may be locked in neutral position.

Under ordinary driving conditions it will not be desirable to have the clutch pedal locked in neutral or low speed positions, and therefore it is another object of the invention to so construct the attachment that when pressure is applied to the pedal at the usual point and in the usual manner, the attachment will be rendered ineffective as a locking means. For example, in operating the clutch pedal of a Ford automobile, it is customary to apply the foot pressure to the heel portion of the footpiece of the pedal rather than to the toe portion thereof, and the attachment embodying the invention includes, as an actuating means, a supplemental footpiece or pedal which is mounted for rocking movement and so fulcrumed and connected with the remainder of the structure that when pressure is applied in the ordinary manner the device will not act to lock the pedal in any position to which it is moved although when pressure is applied to the toe portion of the supplemental pedal, the attachment will be immediately rendered effective. Also by reason of this arrangement, when the pedal has been locked in one or another of the positions stated and it is desired to release the pedal and permit the same to return to normal or high speed position, the pressure of the foot against the supplemental pedal in the natural manner will immediately render the locking means inactive for the purpose stated.

A further object of the invention is to provide a locking device for the purpose stated which will be positive in its action, capable of being immediately rendered active or inactive, and adapted to lock the clutch pedal in any position to which it may be moved.

A further object of the invention is to so construct the attachment that its installation will necessitate no alteration of any of the standard parts of the vehicle nor will its presence in any way interfere with the operation of any of the mechanism of the vehicle.

In the accompanying drawings:

Figure 1 is a perspective view of the attachment applied, so much of the standard equipment of the vehicle being illustrated as is necessary to disclose the application of the invention;

Figure 2 is a group perspective view illustrating the several parts comprising the attachment disassembled;

Figure 3 is a detail vertical front to rear sectional view through the supplemental or auxiliary pedal of the attachment and the clutch member carried thereby, the clutch pedal to which the said auxiliary pedal is connected being shown in side elevation;

Figure 4 is a transverse sectional view taken substantially on the line 4—4 of Figure 3;

Figure 5 is a detail vertical transverse sectional view illustrating the manner of mounting the detent member of the attachment.

In the drawings the numeral 1 indicates in general the clutch pedal of the Ford automobile provided with the usual footpiece 2, and the numeral 3 indicates one side of the chassis frame, the transmission casing being indicated by the numeral 4 and one of the hangers for this casing being indicated by the numeral 5. This hanger is in practice secured to the chassis frame 3 by means of a bolt 6 which is passed through the side member of the frame and through an overhanging portion of the hanger 5.

The attachment embodying the invention comprises a clutch member which is carried by an auxiliary pedal mounted upon the footpiece 2 of the pedal 1, and a detent member which is pivotally supported preferably upon the bolt 6, this having been found to be a very convenient point of mounting for the said detent member. The auxiliary pedal is indicated in general by the numeral 7 and the same is mounted for rocking movement upon the footpiece of the pedal 1 preferably by means of a two-piece bracket indicated in general by the numeral 8. The footpiece 2 is of the usual substantially oval shape and the members comprising the bracket 8 are disposed against the opposite sides of the footpiece, the said bracket members having cheek portions 9 which engage against opposite sides of the usual reinforcing web 10 which is formed on the under side of the footpiece 2 and being provided over the cheek portions with lugs 11 which are engageable over the lateral edges of the said footpiece 2 at the heel portion thereof. The bracket members are further provided at their forward ends with lips 12 which engage over the lateral edges of the toe portion of the footpiece 2, and the body portions of the said bracket members lie beneath the footpiece and are provided with substantially parallel portions 13 through which is fitted a clamping screw 14, this screw being fitted through an opening in one of the said portions 13 and threaded into an opening formed in the other said portion. The lugs 11 engage the footpiece 2 rearwardly of the widest portion thereof, and the lips 12 engage the said footpiece forwardly of the said widest portion thereof so that when the clamping screw 14 is tightened, the members of the bracket will be securely clamped to the footpiece and prevented from displacement with relation thereto. If desired one of the bracket members may be provided with a boss 15 to engage in a recess 16 formed in the other member so as to effect the proper relative positioning of the members when the same are disposed against the opposite sides of the footpiece of the clutch pedal. The members comprising the bracket 8 are further provided with upstanding pivot lugs 17 having bolt openings 18 formed therein, the opening in one of the lugs being threaded for the reception of one end of a pivot bolt 19 which is passed freely through the opening in the other lug. This bolt also passes through openings in pivot lugs 20 formed upon the under side of the auxiliary pedal 7. By reference now to Figure 3 of the drawings it will be observed that the pivot bolt 19 is located in proximity to the toe portion of the footpiece 2 and that the greater portion of the length of the said pedal 7 is located to the rear of the said pivot bolt so that when foot pressure is applied in the customary manner, it will be exerted against that portion of the pedal 7 which lies rearwardly of the pivot bolt 19, thus rocking the pedal upon its fulcrum before pressure is actually applied to the pedal 1. However, it will be understood that pressure may be brought to bear against the toe portion of the pedal 7 or in other words that portion which is located forwardly of the fulcrum 19 so as to rock or tilt the pedal 7 in the other direction.

The clutch member of the device is indicated in general by the numeral 21 and in the illustrated embodiment of the invention this clutch member comprises a stem 22 having an angularly turned outer end 23 which is threaded into a socket 24 formed in a boss located upon the under side of the pedal 7 preferably at the left hand edge of the toe portion thereof. At its lower end the stem 22 is provided with a laterally disposed collar 25 having an opening 26 formed therein, and by reference to Figure 3 it will be observed that this opening has its axis disposed at an oblique angle to the vertical.

The detent member of the device is indicated in general by the numeral 27 and the said member is preferably in the form of a rod provided at its lower end with an eye 28 pivotally fitting the bolt 6. Preferably this bolt will be somewhat longer than the bolt ordinarily employed in securing the hanger 5 to the chassis frame 3, and for the purpose of so securing the hanger a nut 29 may be threaded onto the bolt to bear against the attached portion of the hanger, the eye 28 of the detent rod being then fitted on to the projecting end of the bolt and retained in place by a second nut 30 threaded thereon and held against loss by a cotter pin 31. This rod 27 near its pivoted end is bent to extend laterally inwardly as at 32 and thence upwardly and rearwardly, and finally vertically as at 33, this latter portion passing upwardly and slidably through the opening 26 in the clutch collar 25 and substantially in a vertical line in front of the foot pedal 1.

From the foregoing description of the invention it will be evident that so long as pressure is applied to the clutch pedal by disposing the foot against the rear or heel portion of the auxiliary pedal 7, the clutch pedal may be operated in the ordinary manner and the attachment will be ineffective as a locking means for the pedal inasmuch as under these conditions said auxiliary pedal will be so locked as to swing the stem 22 of the clutch member 27 in a forward direction and thus bring the axis of the opening 26 parallel to the axis of the portion 33 of the detent rod 27, permitting the collar 25 to slide freely on its rod both upwardly and downwardly as the clutch pedal is operated. However, when it is desired to render the attachment effective as automatic lock for the clutch pedal, it is only necessary to shift the pedal to the desired position, at the same time exerting a slight pressure against the forward or toe portion of the auxiliary pedal 7. When this is done the said auxiliary pedal will be so rocked as to swing the stem 22 in a rearward direction thus canting the clutch collar 25 so that the axis of the opening 26 will be disposed at an oblique angle to the portion 33 of the detent rod 27. Under these conditions the spring which returns the clutch pedal 1 to normal or high speed position will cause an upward pull to be exerted upon the stem 22 but the edges of the wall of the opening 26 will, because of the disposition of the collar, grip the detent rod and resist the pull so that the clutch pedal will be locked in the position to which it has been moved. In order to release the locking means it is only necessary to press upon the rear or heel portion of the auxiliary pedal 7 whereupon the clutch collar 25 will release its grip upon the detent rod 27 and will slide freely along the said rod.

In the drawings there has been illustrated a certain definite embodiment of the principles of the invention, this embodiment having been found to be a convenient and satisfactory one, but it will be understood that the structure may be variously modified without departing from the spirit of the invention as defined by the appended claims. For example, the rod 27 might carry the clutch collar 25, and the stem 21 might be extended so as to work through this collar. Also the detent rod 27 might be mounted otherwise than as illustrated in Figure 5 and upon some other portion of the vehicle. Also while the device has been described and illustrated as an attachment, and means is provided whereby the auxiliary pedal 7 thereof may be conveniently mounted upon the footpiece of a usual clutch pedal, it will be evident that I might employ the clutch pedal having an oscillatory foot piece mounted thereon in any suitable manner and carrying the clutch member 21 or its equivalent. It will further be evident that while the member 21 is referred to as a clutch member, and the member 27 as a detent member, the two members coact to constitute as a unit a clutch device and therefore each may be considered as one member of a clutch. It will further be understood that while I have illustrated and described a specific construction of bracket and auxiliary foot pedal mounted thereon, the construction of these parts may be altered in any desired manner so long as the principle involved remains the same. It is also immaterial which portion of the rod 27 is engaged by the clutch collar 25, and therefore the stem 21 may be formed of any desired length, and the rod 27 correspondingly shortened.

While I have herein disclosed the principles of my invention embodied in connection with the clutch pedal of a Ford automobile, it will be understood that I am not to be limited to this particular embodiment but that the invention may be employed in connection with the clutch pedal of any other machine, where desired, or in connection with pedals other than clutch pedals, or in connection with the actuating clutch or other levers of various other mechanisms.

Having thus described the invention, what is claimed as new is:

1. In a locking device for clutch pedals of the class described, an oscillatory foot actuated member associated with the clutch pedal, a clutch member upstanding in advance of the clutch pedal and pivotally movable in consonance therewith, and a clutch member associated with the said foot actuated member and coacting with the first-mentioned clutch member.

2. In a locking device for clutch pedals of the class described, an oscillatory foot actuated member associated with the clutch pedal, a clutch member upstanding in advance of the clutch pedal and pivotally movable in consonance therewith, and a clutch member associated with the said foot actuated member and coacting with the first-mentioned clutch member and active in one position of oscillation of the foot member and inactive in another position of oscillation thereof.

3. In a locking device for clutch pedals of the class described, the combination with the clutch pedal and a stationary member, of a detent rod mounted upon the stationary member upstanding in advance of the clutch pedal and pivotally movable in consonance therewith, and a friction clutch member associated with the clutch pedal slidably engaging the rod and coacting therewith.

4. In a locking device for clutch pedals of the class described, an oscillatory foot actuated pedal member, a detent rod mounted for pivotal movement, and a clutch device carried by the said pedal member and coacting with the rod.

5. In a locking device for clutch pedals of the class described, an oscillatory foot actuated pedal member, a clutch collar carried thereby, and a detent member slidably engaged by the collar and adapted to be gripped by the wall of the collar when the collar is displaced in one direction through oscillation of the said pedal member.

6. In a locking device for clutch pedals of the class described, an oscillatory foot actuated pedal member having an extension, a clutch collar carried by the extension and having an obliquely disposed opening, and a detent member slidably engaged by the collar.

7. In a locking device for clutch pedals of the class described, an oscillatory foot actuated pedal member, a clutch collar carried by the member forwardly of the axis of oscillation, and a detent member slidably engaged by the collar.

8. In a locking device for clutch pedals of the class described, an oscillatory foot actuated pedal member, a stem extending from the toe portion thereof, a clutch collar carried by the stem and having an obliquely disposed opening, and a detent rod pivotally mounted and slidably engaged by the said collar.

9. In a locking device for clutch pedals of the class described, a foot actuated pedal member, means supporting the said member for oscillation and attachable to the foot-piece of the clutch pedal in a manner to locate the axis of oscillation of the pedal member forwardly of the heel portion of the said foot-piece, a member extending from the toe portion of the pedal member, a clutch collar carried by the last-mentioned member and having an obliquely disposed opening, and a pivoted detent rod slidably engaged by the said collar.

10. In a locking device for clutch pedals, the combination with a clutch pedal and a fixed part, of a foot-actuated member mounted for rocking movement on the clutch pedal, a member mounted for free pivotal movement upon the fixed part, and coacting clutch means associated with the members active in one position of rocking movement of the foot-actuated member and inactive in another position of movement thereof.

In testimony whereof I affix my signature.

EDGAR S. ENGLE. [L. S.]